United States Patent
Koorapaty et al.

(10) Patent No.: US 8,111,787 B2
(45) Date of Patent: Feb. 7, 2012

(54) OFDM CHANNEL ESTIMATION METHOD AND APPARATUS

(75) Inventors: Havish Koorapaty, Cary, NC (US); Jiann-Ching Guey, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 617 days.

(21) Appl. No.: 12/265,220

(22) Filed: Nov. 5, 2008

(65) Prior Publication Data

US 2010/0111231 A1    May 6, 2010

(51) Int. Cl.
    *H04L 27/06*    (2006.01)
(52) U.S. Cl. .................................... 375/340; 375/260
(58) Field of Classification Search .............. 375/260, 375/340
    See application file for complete search history.

(56) References Cited

U.S. PATENT DOCUMENTS

| | | | |
|---|---|---|---|
| 2007/0211806 A1* | 9/2007 | Mudulodu et al. | 375/260 |
| 2007/0263752 A1* | 11/2007 | Guey et al. | 375/340 |
| 2008/0165734 A1* | 7/2008 | Hart et al. | 370/330 |
| 2009/0274200 A1* | 11/2009 | Ikram et al. | 375/219 |

FOREIGN PATENT DOCUMENTS

WO   WO 2007/029052 A1   3/2007

\* cited by examiner

*Primary Examiner* — Shuwang Liu
*Assistant Examiner* — David Huang

(57) ABSTRACT

Smaller patterns of regularly-spaced pilot symbols are discerned from a larger pattern of irregularly-spaced pilot symbols transmitted in the time-frequency domain. Accordingly, the irregularly-spaced pilot symbols can be partitioned into at least two different groups of regularly-spaced pilot symbols in the time-frequency domain. Each group of regularly-spaced pilot symbols is individually processed with lower complexity and the results combined to generate an accurate time-frequency channel response estimate. According to an embodiment, a set of irregularly-spaced pilot symbols is transmitted over a time-frequency window. Channel response is estimated based on the pilot symbols by grouping the pilot symbols into subsets of regularly-spaced pilot symbols. An intermediate quantity is generated for each subset of regularly-spaced pilot symbols as a function of the pilot symbols included in the subset. The channel response is estimated over the time-frequency window as a function of the intermediate quantities.

2 Claims, 5 Drawing Sheets

US 8,111,787 B2

OFDM CHANNEL ESTIMATION METHOD AND APPARATUS

TECHNICAL FIELD

The present invention generally relates to channel estimation, and more particularly relates to channel estimation for OFDM systems.

BACKGROUND

The response of a wireless communication channel is estimated by a wireless receiver so that the receiver can coherently demodulate received data symbols. Channel estimation is typically performed using known symbols referred to as pilot symbols. Pilot symbols are transmitted in the time-frequency domain in OFDM (Orthogonal Frequency-Division Multiplexing) systems. The pilot symbols sample the time-frequency response of the OFDM channel which is a slow-varying, two-dimensional process. The response of an OFDM channel is conventionally estimated based on pilot symbols using minimum mean-square error estimation (MMSE), maximum-likelihood (ML) estimation or other approaches that are suboptimal such as interpolation.

MMSE channel estimation typically requires prior knowledge of channel statistics and tends to be highly complex because of the matrix inversion performed during the channel estimation process. The size of the matrix inversion performed by an MMSE estimator depends on the number of pilot symbol observations. In OFDM systems, pilot symbol density must be sufficiently large so that receiving devices can properly reconstruct an accurate representation of the time-frequency channel response. This in turn can dramatically increase the size of the matrix inversion performed by an MMSE channel estimator, significantly increasing MMSE estimation complexity. ML channel estimation also tends to be relatively complex, but not as complex as MMSE estimation. When pilot symbols are regularly spaced, ML estimation can be implemented using a two-dimensional FFT (fast-Fourier transform) process that yields the channel response in the delay-Doppler domain.

The complexity of both MMSE and ML estimators tends to increase significantly when pilot symbol spacing is irregular. Many types of OFDM systems have high pilot symbol density and irregular pilot symbol spacing. For example, the downlink specified in IEEE (the Institute of Electrical and Electronics Engineers) standard 802 16e (WiMAX) has 120 pilots for each OFDM symbol. Pilot spacing is also irregular, meaning that pilot symbols are transmitted at different time and frequency intervals. The Long Term Evolution (LTE) standard specified in Release 8 of 3GPP (3rd Generation Partnership Project) also calls for irregular pilot symbol spacing. The matrix inversion performed by a conventional MMSE estimator increases significantly when pilot symbol spacing is irregular. The complexity of a conventional ML estimator also increases when the estimator processes irregularly-spaced pilot symbols. An interpolation-based technique can be used to perform channel estimation when pilot symbol density is relatively high, but is sub-optimal and sacrifices accuracy for less complexity.

SUMMARY

Smaller patterns of regularly-spaced pilot symbols can be discerned from a larger pattern of irregularly-spaced pilot symbols transmitted in the time-frequency domain. Accordingly, the irregularly-spaced pilot symbols can be partitioned into at least two different groups of regularly-spaced pilot symbols in the time-frequency domain. Each group of regularly-spaced pilot symbols is individually processed with lower complexity and the results combined to generate an accurate time-frequency channel response estimate.

According to an embodiment, a set of irregularly-spaced pilot symbols is transmitted over a time-frequency window. Channel response is estimated based on the pilot symbols by grouping the pilot symbols into subsets of regularly-spaced pilot symbols. An intermediate quantity is generated for each subset of regularly-spaced pilot symbols as a function of the pilot symbols included in the subset. The channel response is estimated over the time-frequency window as a function of the intermediate quantities.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
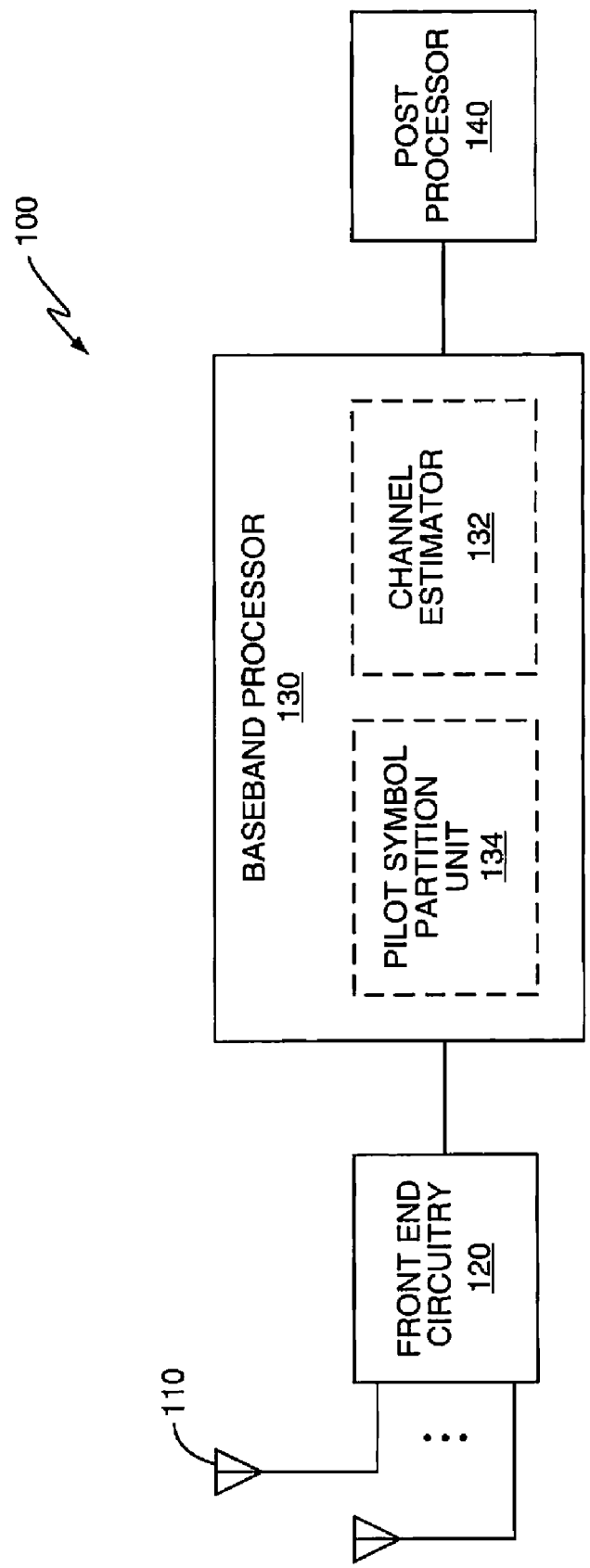
FIG. 1 illustrates a block diagram of an embodiment of a wireless receiver.

FIG. 1 illustrates an embodiment of a wireless receiver 100 such as a mobile phone or a wireless Local Area Network (LAN) adapter. The receiver 100 processes OFDM signals transmitted in the time-frequency domain, e.g., in accordance with LTE, WiMAX, etc. Irregularly-spaced pilot symbols are transmitted in the time-frequency domain to aid in channel estimation at the receiver 100. The receiver 100 includes one or more antennas 110, front end circuitry 120, a baseband processor 130 and a post processor 140. Each antenna 110 receives an OFDM signal transmitted over a multipath fading channel. Received signals are down-converted to corresponding baseband signals by the front end circuitry 120 such as one or more amplifiers, filters, mixers, digitizers, etc. The baseband processor 130 demodulates received data symbols based on an estimate of the channel. A channel estimator 132 included in or associated with the baseband processor 130 generates the channel estimate. A pilot symbol partition unit 134 included in or associated with the baseband processor 130 partitions the irregularly-spaced pilot symbols into at least two different groups of regularly-spaced pilot symbols in the time-frequency domain. The channel estimator 132 processes the smaller subsets of regularly-spaced pilot symbols to estimate the channel instead of a single larger set of irregularly-spaced pilot symbols, reducing channel estimation complexity while maintaining sufficient accuracy. The baseband processor 130 uses the channel estimate to obtain soft bit values from the demodulated data symbols, e.g., by weighting and combining various components of the baseband signal. The baseband processor 130 provides the soft bit values to the post processor 140 for subsequent processing such as error correction, etc.

Figure 2:
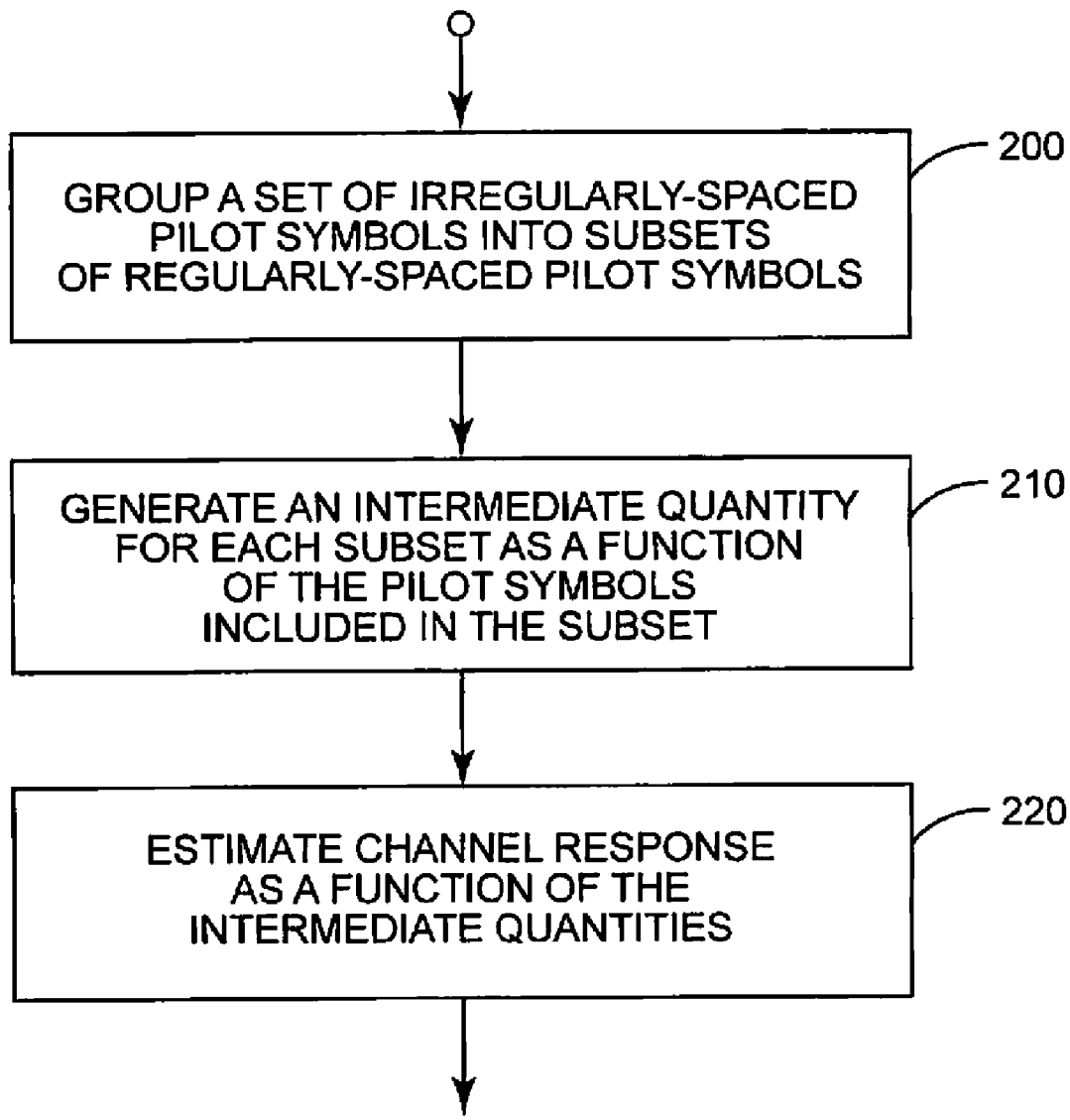
FIG. 2 illustrates an embodiment of a method for estimating channel response based on a set of irregularly-spaced pilot symbols transmitted over a time-frequency window.

FIG. 2 illustrates an embodiment of program logic implemented by the baseband processor 130 for performing channel estimation. The program logic begins by the pilot symbol partition unit 134 grouping a set of irregularly-spaced pilot symbols into subsets of regularly-spaced pilot symbols in the time-frequency domain (Step 200). The channel estimator 132 generates an intermediate quantity for each subset of regularly-spaced pilot symbols as a function of the pilot symbols included in the subset (Step 210). The channel estimator 132 also computes an estimate of the channel response as a function of the different intermediate quantities (Step 220). The baseband processor 130 uses the composite channel estimate obtained based on the pilot symbol groupings to demodulate received data symbols as is well known in the art. According to one embodiment, the irregularly-spaced pilot symbols are grouped into subsets of regularly-spaced pilot symbols based on a priori pilot spacing information.

Figure 3:
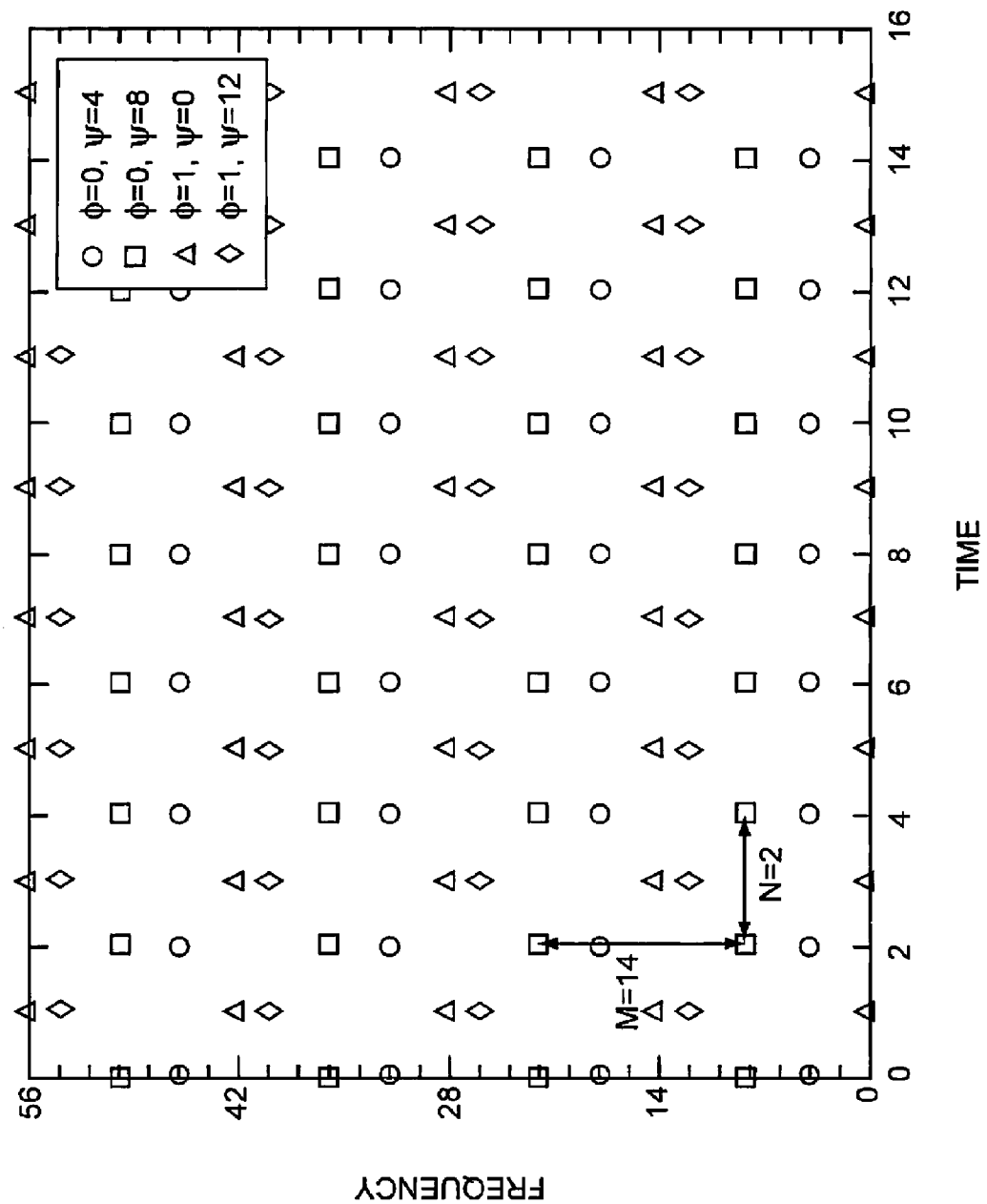
FIG. 3 illustrates a plot diagram of an embodiment of irregularly-spaced WiMAX pilot symbols grouped into subsets of regularly-spaced pilot symbols.

FIG. 3 shows an embodiment of how the pilot symbol partition unit 134 groups a set of irregularly-spaced pilot symbols based on a priori WiMAX pilot spacing information. Pilot symbols transmitted over a particular time-frequency window in accordance with WiMAX are irregularly spaced as shown in FIG. 3. The pilot symbol partition unit 134 partitions the irregularly-spaced pilot symbol pattern into at least four subsets of regularly-spaced WiMAX pilot patterns and identifies the pilot symbols associated with each regularly-spaced pattern. The first regularly-spaced pattern has an initial frequency offset ($\phi$) of 0 and a time offset ($\psi$) of 4. The second regularly-spaced pattern has an initial frequency offset of 0 and a time offset of 8. The third regularly-spaced pattern has an initial frequency offset of 1 and a time offset of 0 and the fourth pattern has an initial frequency offset of 1 and a time offset of 12. The pilot symbols included in each subset are regularly-spaced apart in frequency (M=14 sub-carriers) and time (N=2).

Figure 4:
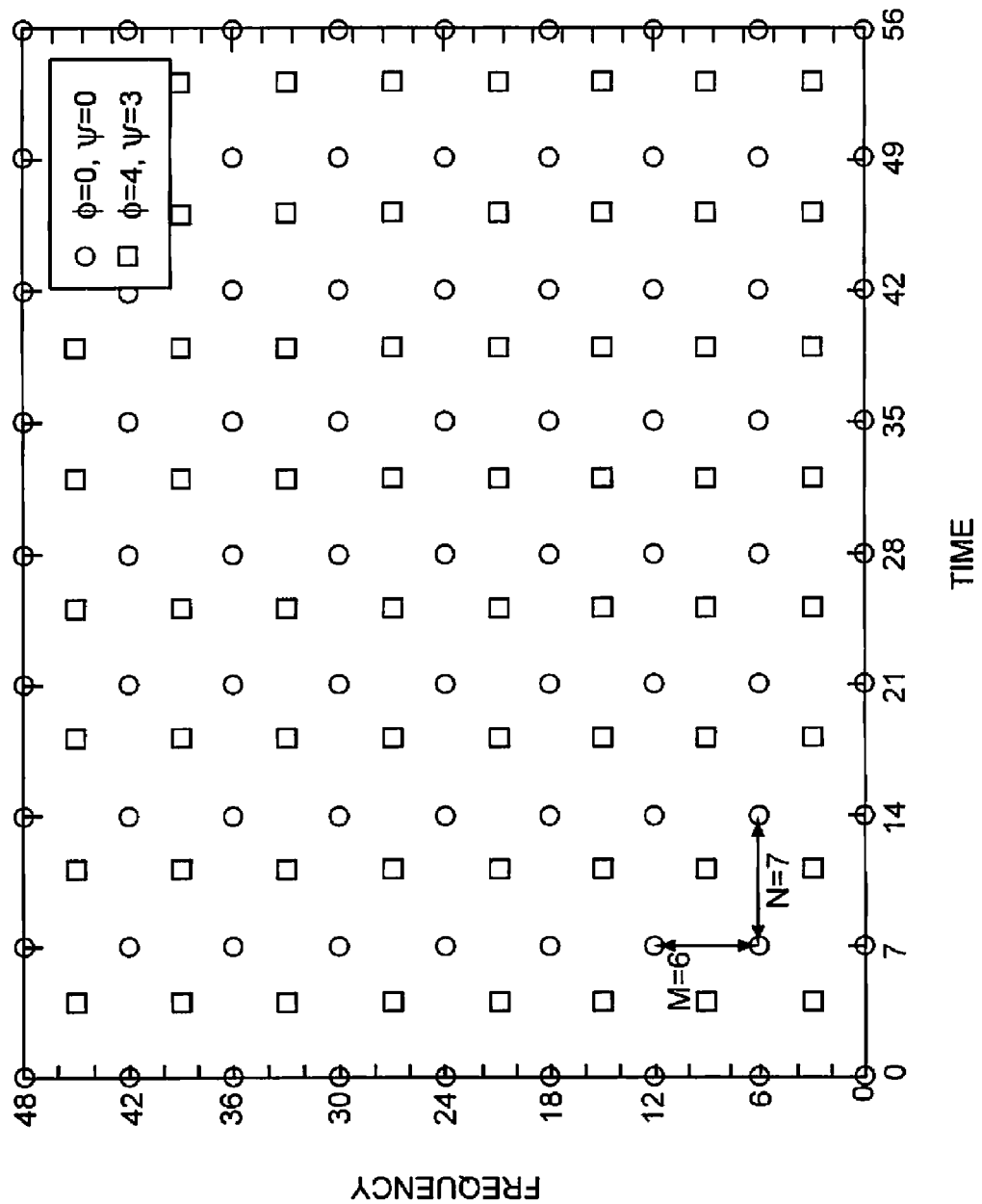
FIG. 4 illustrates a plot diagram of an embodiment of irregularly-spaced LTE pilot symbols grouped into subsets of regularly-spaced pilot symbols.

FIG. 4 shows an embodiment of how the pilot symbol partition unit 134 groups a set of irregularly-spaced pilot symbols based on a priori LTE pilot spacing information. The pilot symbol partition unit 134 partitions the irregularly-spaced LTE pilot symbol pattern into at least two regularly-spaced pilot patterns over the time-frequency window. The first regularly-spaced pattern has an initial frequency offset ($\phi$) of 0 and a time offset ($\psi$) of 0. The second regularly-spaced pattern has an initial frequency offset of 4 and a time offset of 3. The pilot symbols included in each subset are regularly-spaced apart in frequency (M=6 sub-carriers) and time (N=7).

In yet another embodiment, irregularly-spaced OFDM pilot symbols can be grouped into subsets of regularly-spaced pilot symbols by blindly detecting the communication mode used to transmit the pilot symbols. The baseband processor 130 and/or the pilot symbol partition unit 134 can determine if a pilot symbol pattern is irregular based on the communication mode, and if so, whether the irregular pattern can be partitioned into smaller, regularly-spaced patters. The communication mode may correspond to the transmission technology (e.g., WiMAX, LTE, etc.) or can be any other type of information relating to the communication of information over a wireless channel that can be used to determine pilot spacing. The pilot symbols are then grouped into subsets of regularly-spaced pilot symbols based on the communication mode. In each pilot grouping embodiment, the channel estimator 132 generates a composite channel estimate based on the smaller subsets of regularly-spaced pilot symbols instead of a single larger set of irregularly-spaced pilot symbols.

Figure 5:
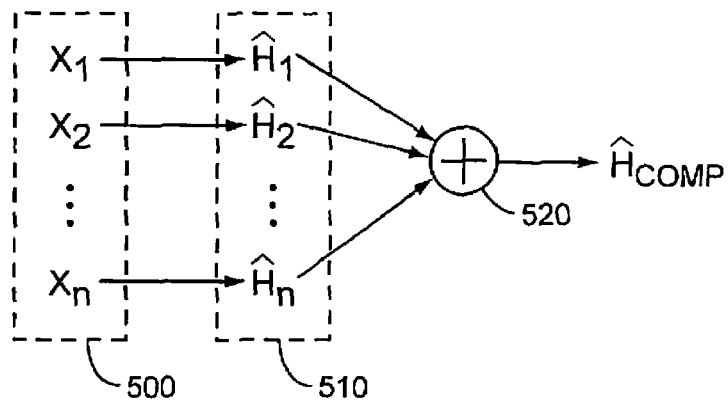
FIG. 5 illustrates an embodiment of a method for estimating channel response based on subsets of regularly-spaced pilot symbols.

FIG. 5 illustrates one embodiment where the intermediate quantities derived by the channel estimator 132 for each subset of regularly-spaced pilot symbols are computed using an MMSE model. In more detail, a discrete frequency domain received OFDM sample can be expressed as:

$$X[t,f]=H[t,f]\Lambda[t,f]+Z[t,f] \quad (1)$$

where the index [t, f] corresponds to the $f^{th}$ frequency sub-carrier in the $t^{th}$ OFDM symbol, H[t, f] is the time-frequency response of the channel at a particular point, $\Lambda$[t, f] is the transmitted symbol and Z[t, f] represents Additive White Gaussian Noise (AWGN). The baseband processor 130 estimates the channel response H[t, f] based on known pilot symbols and uses the channel response H[t, f] to coherently demodulate received data symbols. The pilot observations X[t, f] can be concisely expressed in matrix form by arranging the observations into a column vector as given by:

$$X_1=\Lambda_1 H_1+Z_1 \quad (2)$$

where $\Lambda_1$ is a diagonal matrix containing the pilot symbols as diagonal elements and $X_1$, $H_1$ and $Z_1$ are column vectors of the same size corresponding to the pilot observation, channel and noise, respectively.

The observations from all regular pilots can be stacked into a column vector as given by:

$$\begin{bmatrix} X_1 \\ X_2 \\ \vdots \end{bmatrix} = \begin{bmatrix} \Lambda_1 & 0 & \dots \\ 0 & \Lambda_2 & \dots \\ \vdots & \vdots & \ddots \end{bmatrix} \begin{bmatrix} H_1 \\ H_2 \\ \vdots \end{bmatrix} + \begin{bmatrix} Z_1 \\ Z_2 \\ \vdots \end{bmatrix} \quad (3)$$

The column-vector form of equation (3) can be converted to matrix-form by introducing the subscript t as given by:

$$X_t=\Lambda_t H_t+Z_t \quad (4)$$

In one embodiment, the channel H[t, f] can be modeled as a two-dimensional, zero-mean White Sense Stationary (WSS) Gaussian random process having the following correlation:

$$\Gamma[t_1-t_2,f_1-f_2]=E\{H[t_1,f_1]H^*[t_2,f_2]\} \quad (5)$$

The channel correlation represented by equation (5) is typically known or can be estimated from past observation. The MMSE channel estimation can be formulated based on the channel statistics and the matrix representation of equation (4) as explained next.

In more detail, let H denote the column vector containing the channel response at the locations to be estimated in the time-frequency domain. For example, this can be any part of the 16 OFDM symbols by 56 frequency sub-carriers shown in the window area of FIG. 3. The MMSE estimate of H is the mean of H conditioned on the observation $X_t$ as given by:

$$\hat{H}(X_t) = E\{H \mid X_t\} \quad (6)$$

$$= \Pi_{H \times t} \Pi_{X_t}^{-1} X_t$$

$$= \Pi_{HH_t} \Lambda_t^H (\Lambda_t \Pi_{H_t} \Lambda_t^H + \sigma_Z^2 I)^{-1} X_t$$

where $\Pi_{H_t}=E\{H_t H_t^H\}$ denotes the auto covariance matrix of $H_t$, $\Pi_{HH_t}=E\{HH_t^H\}$ is the covariance matrix between H and $H_t$ and $\Pi_{HX_t}$ is the similarly defined covariance matrix between H and $X_t$. The elements in the different covariance matrices can be derived using the channel correlation function of equation (5). Accordingly, the MMSE channel estimation process becomes a linear operation that transforms the pilot observation vector $X_t$ into a vector containing the channel estimates at the desired locations.

The pilot symbol observations 500 corresponding to the $i^{th}$ regular pilot symbol pattern over the time-frequency window limited by the symbol range $0 \leq t < N_{SYM}$ and the frequency sub-carrier range $0 \leq f < N_{SUB}$ are given by:

$$X_i[t, f] = \begin{cases} X[t, f] & \text{for } t = nN + \varphi_i, f = mM + \psi_i \\ 0, & \text{otherwise} \end{cases} \quad (7)$$

where $\phi_i$ represents frequency offset, $\psi_i$ represents time offset, $0 \leq n < Q$, $0 \leq m < K$, $N_{SYM} = NQ$ and $N_{SUB} = MK$. A more concise matrix expression of equation (4) when considering i subsets of regularly-spaced pilot symbols is given by:

$$X_{i;n,m} = \Lambda_i H_{i;n,m} + Z_{i;n,m} \quad (8)$$

According to the MMSE estimation embodiment, the intermediate quantity derived for each subset of regularly-spaced pilot symbols is an intermediate channel response estimate $\hat{H}_i[t, f]$ 510 computed using equations (6) and (8) where the index i corresponds to the $i^{th}$ regularly-spaced pilot pattern 500 under consideration. Thus, each subset of regularly-spaced pilot symbols determined by the pilot symbol partition unit 134 is used to generate an intermediate MMSE channel estimate $\hat{H}_i[t, f]$ 510. A signal combiner 520 included in or associated with the channel estimator 132 combines the different intermediate MMSE channel estimates $\hat{H}_i[t, f]$ to form a composite MMSE estimate of the channel as given by:

$$\hat{H}_{COMP}[t, f] = \sum_i \hat{H}_i[t, f] \quad (9)$$

Figure 6:
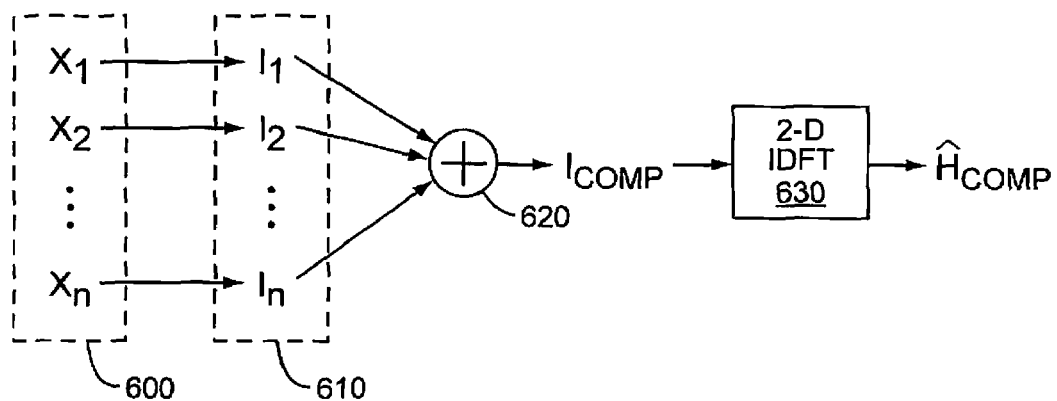
FIG. 6 illustrates another embodiment of a method for estimating channel response based on subsets of regularly-spaced pilot symbols.

FIG. 6 illustrates another embodiment where the intermediate quantities derived by the channel estimator 132 for each subset of regularly-spaced pilot symbols are computed using a delay-Doppler model. In more detail, an intermediate delay-Doppler image 610 of the channel defined over the delay range $0 \leq \tau < K$ and the Doppler range $0 \leq v < Q$ and derived from the $i^{th}$ regular pilot pattern 600 is given by:

$$I_i[\tau, v] = \sum_{t=0}^{N_{SYM}-1} \sum_{f=0}^{N_{SUB}-1} X_i[t, f] e^{\frac{j2\pi ft}{N_{SUB}} - \frac{j2\pi vt}{N_{SYM}}} \quad (10)$$

$$= \sum_{n=0}^{Q-1} \sum_{m=0}^{K-1} X_{i;n,m} e^{\frac{j2\pi(mM+\psi_i)}{KM}} e^{-\frac{j2\pi v(nM+\varphi_i)}{NQ}}$$

$$= e^{\frac{j2\pi \psi_i \tau}{KM} - \frac{j2\pi v \varphi_i}{NQ}} \sum_{n=0}^{Q-1} \sum_{m=0}^{K-1} X_{i;n,m} e^{\frac{j2\pi m\tau}{K}} e^{-\frac{j2\pi vn}{Q}}$$

Each intermediate delay-Doppler image $I_i[\tau, v]$ 610 represents the two-dimensional DFT (discrete Fourier transform) of the observation 600 of size (Q,K) corresponding to the $i^{th}$ regular pilot symbol pattern. Patterns of different offsets ($\phi_i$, $\psi_i$) are phase modulated by the leading term in equation (10). A signal combiner 620 included in or associated with the channel estimator 132 combines the different intermediate delay-Doppler images $I_i[\tau, v]$ 610 to obtain a composite delay-Doppler image as given by:

$$I_{COMP}[\tau, v] = \sum_i I_i[\tau, v] \quad (11)$$

The baseband processor 130 and/or the channel estimator 132 convert the composite delay-Doppler image $I_{COMP}[\tau, v]$ from the delay-Doppler domain to the time-frequency domain to obtain a composite estimate $\hat{H}_{COMP}$ of the channel. In one embodiment, the composite delay-Doppler image is converted to the time-frequency domain by a two-dimensional inverse DFT (IDFT) function 630 of size $(N_{SYM}, N_{SUB})$. In one embodiment, the composite delay-Doppler image $I_{COMP}[\tau, v]$ is filtered before conversion to the time-frequency domain. According to this embodiment, the two-dimensional IDFT function 630 is performed over the entire time-frequency window to yield the composite channel estimate $\hat{H}_{COMP}$ as given by:

$$\hat{H}_{COMP}[t, f] = \quad (12)$$

$$\sum_{\tau=0}^{N_{SUB}-1} \sum_{v=0}^{N_{SYM}-1} I_{COMP}[\tau, v] W[\tau, v] e^{\frac{-j2\pi f \tau}{N_{SUB}}} e^{\frac{j2\pi vt}{N_{SYM}}}$$

where $W[\tau, v]$ is a windowing function for removing sampling artifacts. In one embodiment, the windowing function $W[\tau, v]$ is a two-dimensional brick-wall filter that eliminates non-zero elements of the composite delay-Doppler image outside the maximum delay-Doppler spread as given by:

$$W[\tau, v] = \begin{cases} 1 & \text{for } 0 \leq \tau_{max}, 0 \leq v < v_{max} \\ 0, & \text{otherwise} \end{cases} \quad (13)$$

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A receiver comprising a baseband processor configured to:
   group a set of irregularly-spaced pilot symbols transmitted over a time-frequency window into subsets of regularly-spaced pilot symbols;
   generate an intermediate quantity for each subset of regularly-spaced pilot symbols as a function of the pilot symbols included in the subset; and
   estimate channel response over the time-frequency window as a function of the intermediate quantities,
   wherein the baseband processor is configured to (i) generate an intermediate delay-Doppler image for each subset of regularly-spaced pilot symbols as a function of the pilot symbols included in the subset; (ii) combine the intermediate delay-Doppler images to form a composite delay-Doppler image and convert the composite delay-Doppler image from the delay-Doppler domain to the time-frequency domain and (iii) wherein the baseband processor is configured to filter the composite delay-Doppler image before conversion to the time-frequency domain.

2. The receiver of claim 1, wherein the baseband processor is configured to reduce non-zero elements of the composite delay-Doppler image outside a predetermined delay-Doppler spread.

* * * * *